R. DUTTON.
Harvesting-Machine
No. 212,134. Patented Feb. 11, 1879.
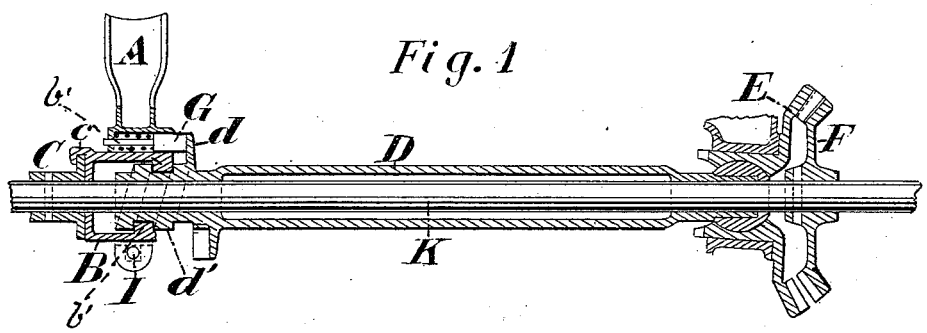
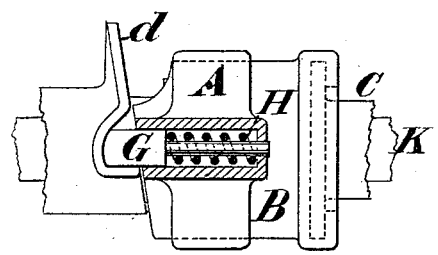 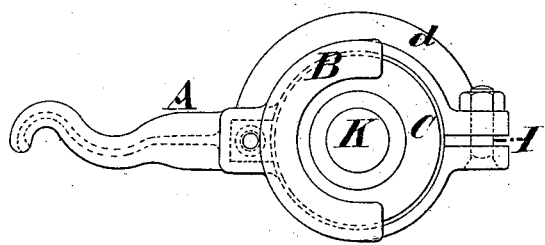
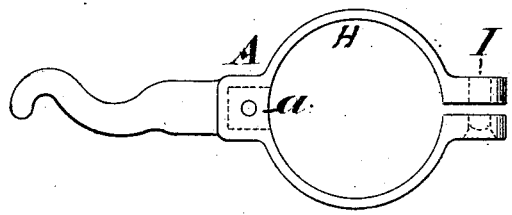
Witnesses:
Inventor:
R. Dutton

UNITED STATES PATENT OFFICE.

RUFUS DUTTON, OF YONKERS, NEW YORK.

IMPROVEMENT IN HARVESTING-MACHINES.

Specification forming part of Letters Patent No. 212,134, dated February 11, 1879; application filed December 5, 1878.

*To all whom it may concern:*

Be it known that I, RUFUS DUTTON, of the city of Yonkers, in the county of Westchester, and State of New York, have invented a new and useful Improvement in Harvesting-Machines; and I do hereby declare that the following is a full, clear, and exact description thereof, and of its mode or manner of operation, reference being had to the accompanying drawings, and to the letters of reference marked thereon, and making a part of this specification.

My invention relates to an improved mechanism for shifting the gearing of harvesting-machines, and by which the gear can be adjusted so as to work together with greater precision than has before been attainable.

The object of my invention is the production of a gear-shifter which shall be durable, not liable to become loose from wear, and which can readily be adjusted so as to cause the gear-teeth to work together at the proper depth.

My invention consists in the use of a coarse-threaded nut, coupled at one end to a metallic piece, upon which it can freely turn, but which does not allow of end movement of the nut, the other end of the nut turning upon the threaded end of the shaft or sleeve to which the gear to be shifted is connected, and in combination therewith an adjustable handle clamped around the nut, for the purpose of turning it, said handle or nut being held in the position desired by a spring-bolt, working into recesses on the sleeve.

In the accompanying drawings, in which similar letters of reference indicate like parts, Figure 1 is a longitudinal section of the two beveled differential gears of the main axle and sleeve, which has its end threaded for the reception of the nut, of the handle clamped around the nut, and the metallic piece to which the nut is coupled, and also of the bolt and spring for holding the nut in position. Fig. 2 is a longitudinal section, showing the flange on the end of the sleeve, the nut, the piece to which it is coupled, the spring-bolt, and the spring. Fig. 3 is an end view of the handle, the nut, and the flange on the nut, forming part of the coupling. Fig. 4 shows the handle, with the device which clamps the nut, and the bolt and recess for the spring-bolt.

K, Fig. 1, is the main axle, passing through the sleeve D, in which it freely turns. F is the rotating or driving gear, fastened firmly, by a pin or otherwise, to the axle K, and turning with it. E is the shifting or oscillating gear, fastened to the end of the sleeve D. On the other end of this sleeve are coarse, heavy threads $d'$, in which a similar thread, $b'$, in the nut B works. The nut B is coupled to the metallic piece by the flange $c$, so as to permit such nut to turn on such flange; and the metallic piece C is fastened rigidly to the axle and turns with it, so that the nut B can have no end or lateral movement.

As the nut B is turned, the sleeve D and the oscillating or shifting gear E, fastened to it, will be moved toward or away from the gear F, fastened upon the axle.

Surrounding the nut B is a ring or collar, H, which is firmly clamped to it by the bolt I; and to such ring or collar is connected, as illustrated in the drawings, the handle A. As such handle is moved, the nut B will be turned and the sleeve moved, and the gear shifted.

G, Figs. 1 and 2, is a spring-bolt attached to the ring H, which alternates when the gear is shifted from one recess to another in the flange $d$, and is held therein by the coiled spring, J. This bolt prevents the nut turning except as it is lifted in the manner hereinafter described. The thread on the nut forms a continuous bearing around the thread on the sleeve, and hence is not liable to become worn.

The operation of the device is as follows: When the handle A is turned, the spring-bolt G is forced back up the inclined slide of a recess in the flange $d$, Fig. 2. The handle, being clamped firmly to the nut, turns the nut with it; and as the end of the nut is coupled to the metallic piece C, and thereby held from moving endwise on the axle when the nut is turned upon the threaded end of the sleeve, the sleeve and the gear E are moved toward or from the driving-gear F, according to the direction in which the handle and nut are turned. When the nut B is turned back far enough to carry the spring-bolt G from one recess in the flange $d$ to the other, the gear E is moved out of the gear F with sufficient clearance. When the nut is turned forward the gears are brought together.

By loosening the nut on the bolt I, the ring or collar H can readily be turned upon the nut B, and can be clamped at any position to bring the gears at the right depth with each other when the spring-bolt G is in the forward recess in the flange d.

As illustrated in the drawings, the handle A is connected directly to the collar or ring H, these two parts thus making virtually one part. This arrangement is convenient, but is not necessary, as it is evident that the two parts can be made separate, and can be attached separately to the other parts of the mechanism, and the adjustability of the nut for the purpose of adjusting the gearing, and also its rotation for the purpose of shifting the gear, be secured.

What is claimed as new is—

1. The combination, with the rotating nut B and threaded sleeve D, of the adjusting-collar H, substantially as and for the purposes set forth.

2. In combination with the rotating nut B, the handle A and adjusting-collar H, substantially as described.

3. The spring-bolt G, in combination with the rotating nut B, ring H, and recessed flange d, substantially as and for the purposes set forth.

R. DUTTON.

Witnesses:
L. NELSON WHITE,
SAMUEL LEA.